United States Patent
Arrizabalaga et al.

(10) Patent No.: US 10,324,993 B2
(45) Date of Patent: Jun. 18, 2019

(54) PREDICTING A SEARCH ENGINE RANKING SIGNAL VALUE

(71) Applicant: Google LLC, Mountain View, CO (US)

(72) Inventors: Javier Spagnolo Arrizabalaga, Zurich (CH); Malte Nuhn, Zurich (CH); Quoc V. Le, Sunnyvale, CA (US); Daniel Duckworth, Salinas, CA (US); Matthias Heiler, Zurich (CH)

(73) Assignee: Google LLC, Mountain View, CA (US)

( * ) Notice: Subject to any disclaimer, the term of this patent is extended or adjusted under 35 U.S.C. 154(b) by 60 days.

(21) Appl. No.: 15/369,849

(22) Filed: Dec. 5, 2016

(65) Prior Publication Data
US 2018/0157758 A1  Jun. 7, 2018

(51) Int. Cl.
*G06N 3/08* (2006.01)
*G06F 16/95* (2019.01)
(Continued)

(52) U.S. Cl.
CPC .......... *G06F 16/9535* (2019.01); *G06F 16/95* (2019.01); *G06F 16/958* (2019.01); *G06N 3/08* (2013.01)

(58) Field of Classification Search
CPC .......... G06F 17/30867; G06F 17/3053; G06F 17/30864; G06F 17/30554; G06F 17/30321; G06F 2217/16
See application file for complete search history.

(56) References Cited

U.S. PATENT DOCUMENTS

| 7,243,102 B1 | 7/2007 | Naam et al. |
| 7,634,463 B1 * | 12/2009 | Katragadda ............ G06Q 10/10 701/431 |

(Continued)

FOREIGN PATENT DOCUMENTS

WO    WO 2014/160282    10/2014

OTHER PUBLICATIONS

International Search Report and Written Opinion issued in International Application No. PCT?US2017/064558, dated Feb. 26, 2018, 16 pages.

(Continued)

*Primary Examiner* — Yuk Ting Choi
(74) *Attorney, Agent, or Firm* — Fish & Richardson P.C.

(57) ABSTRACT

Methods, systems, and apparatus including computer programs encoded on a computer storage medium, for augmenting search engine index that indexes resources from a collection of resources. In one aspect, a method of augmenting a first search engine index that indexes resources from a first collection of resources includes the actions of identifying a first resource, in the first collection of resources, that is indexed in the first search engine index for which a value of a search engine ranking signal is not available, wherein a search engine uses values of the search engine ranking signal in ranking resources in response to received search queries; processing text from the first resource using a machine learning model, the machine learning model being configured to: process the text to predict a value of the search engine ranking signal for the first resource; and updating the first search engine index by associating the predicted value of the search engine ranking signal with the first resource in the first search engine index.

20 Claims, 5 Drawing Sheets

(51) Int. Cl.
*G06F 16/958* (2019.01)
*G06F 16/9535* (2019.01)

(56) References Cited

U.S. PATENT DOCUMENTS

| | | | |
|---|---|---|---|
| 7,966,282 B2 | 6/2011 | Pinckney et al. | |
| 8,051,080 B2 | 11/2011 | Kraft et al. | |
| 8,190,627 B2 | 5/2012 | Platt et al. | |
| 8,386,401 B2 | 2/2013 | Virkar et al. | |
| 8,601,030 B2 | 12/2013 | Bagchi et al. | |
| 8,671,093 B2 | 3/2014 | Chapelle et al. | |
| 8,793,706 B2 | 7/2014 | Villadsen et al. | |
| 9,715,496 B1* | 7/2017 | Sapoznik | G06F 17/279 |
| 2006/0059121 A1 | 3/2006 | Cheng et al. | |
| 2009/0024546 A1 | 1/2009 | Ficcaglia et al. | |
| 2010/0070486 A1* | 3/2010 | Punaganti Venkata | G06F 17/30893 707/722 |
| 2012/0011112 A1* | 1/2012 | Bian | G06F 17/30864 707/723 |
| 2012/0233096 A1 | 9/2012 | Gupta et al. | |
| 2013/0086083 A1 | 4/2013 | Zou et al. | |
| 2014/0337358 A1 | 11/2014 | Mitra et al. | |
| 2015/0066973 A1* | 3/2015 | Kim | G06F 17/30979 707/766 |

OTHER PUBLICATIONS

Sutskever et al., "Sequence to sequence learning with neural networks," Advances in neural information processing systems. 2014, 9 pages.

Wu et al., "Google's Neural Machine Translation System: Bridging the Gap between Human and Machine Translation," ArXiv preprint arXiv 2016, 1609.08144, 23 pages.

Vinyals et al., "Show and tell: A neural image caption generator," Proceedings of the IEEE Conference on Computer Vision and Pattern Recognition, 2015, 9 pages.

Office action issued in British Application No. GB1720222.7, dated May 24, 2018, 5 pages.

* cited by examiner

PREDICTING A SEARCH ENGINE RANKING SIGNAL VALUE

BACKGROUND

This specification generally relates to training a machine learning model that predicts values of search engine ranking signals for resources that are indexed in an index database of a search system.

Online search engines generally rank resources in response to received search queries to present search results identifying resources that are responsive to the search query. Search engines generally present the search results in an order that is defined by the ranking. Search engines may rank the resources based on various factors, i.e., based on various search engine ranking signals, and using various ranking techniques.

SUMMARY

This specification describes technologies for generating values of search engine ranking signals for resources indexed in an index database of a search system.

In general, one innovative aspect of the subject matter described in this specification can be embodied in methods that augment a first search engine index that indexes resources from a first collection of resources. The methods include identifying a first resource, in the first collection of resources, that is indexed in the first search engine index for which a value of a search engine ranking signal is not available, wherein a search engine uses values of the search engine ranking signal in ranking resources in response to received search queries; processing text from the first resource using a machine learning model, the machine learning model being configured to: process the text to predict a value of the search engine ranking signal for the first resource; and updating the first search engine index by associating the predicted value of the search engine ranking signal with the first resource in the first search engine index. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes identifying a plurality of second resources from a second search engine index that indexes a second collection of resources, each of the second resources being associated in the second search engine index with a respective value of the search engine ranking signal for the second resource; generating training data that includes, for each of the plurality of second resources: text of the second resource, and the respective value of the search engine ranking signal for the second resource; and training the machine learning model on the training data. The second collection of resources is a collection of Internet resources. The first collection of resources is different from the second collection of resources. The first collection of resources is a collection of entity-specific resources. The predicted value of the search engine ranking signal for the first resource includes one or more search queries that users would submit to the search engine to search for the first resource. The machine learning model comprises: an encoder neural network configured to process the text of the first resource to generate an encoded representation of the first resource; and a first decoder neural network configured to generate the predicted value of the search engine ranking signal using the encoded representation of the first resource. A value of a second search engine ranking signal also used by the search engine in ranking resources in response to received search queries is also not available for the first resource, and wherein the method further comprises: processing the encoded representation of the first resource using a second decoder neural network configured to generate a predicted value of the second search engine ranking signal using the encoded representation of the first resource.

In general, another innovative aspect of the subject matter described in this specification can be embodied in methods that augment a first search engine index that indexes resources from a first collection of resources. The methods include identifying a plurality of first resources from a first search engine index that indexes a first collection of resources, each of the first resources being associated in the first search engine index with a respective value of the search engine ranking signal for the first resource; generating training data that includes, for each of the plurality of first resources: text of the first resource, and the respective value of the search engine ranking signal for the first resource; training a machine learning model on the training data, wherein the machine learning model is configured to: receive text of a resource, and process the text of the resource to generate a predicted value of the search engine ranking signal for the resource. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes identifying a second resource, in a second collection of resources, that is indexed in a second search engine index for which a value of a search engine ranking signal is not available, wherein a search engine uses values of the search engine ranking signal in ranking resources in response to received search queries; processing text from the second resource using the trained machine learning model, the trained machine learning model being configured to: process the text to predict a value of the search engine ranking signal for the second resource; and updating the second search engine index by associating the predicted value of the search engine ranking signal with the second resource in the second search engine index. The first collection of resources is a collection of Internet resources. The second collection of resources is different from the first collection of resources. The second collection of resources is a collection of entity-specific resources. The predicted value of the search engine ranking signal for the second resource includes one or more search queries that users would submit to the search engine to search for the second resource. The machine learning model comprises: an encoder neural network configured to process the text of the second resource to generate an encoded representation of the second resource; and a second decoder neural network configured to generate the predicted value of the search engine ranking signal using the encoded representation of the second resource. A value of a first search engine ranking signal also used by the search engine in ranking resources in response to received search queries is also not available for the second resource, and wherein the method further comprises: processing the encoded representation of the second resource using a first decoder neural network configured to generate a predicted value of the first search engine ranking signal using the encoded representation of the second resource.

The subject matter described in this specification can be implemented in particular embodiments so as to realize one or more of the following advantages. Conventional search systems rank resources responsive to search queries using values of search engine ranking signals that are associated with the resources. These conventional search systems typically require values of the search engine ranking signals to be known in order to effectively rank resources, making it difficult to rank resources for which values of search engine ranking signals are not available. Unlike conventional search systems, the search system described in this specification includes a machine learning model to generate values of search engine ranking signals for resources for which values of search engine ranking signals are not available. The search system can update a search engine index that indexes resources with the generated values of the search engine ranking signals for the resources and the generated values can then be used by the search engine in ranking the resources. Thus, the completeness of the search engine index and, in turn, the accuracy and the efficiency of the search engine can be improved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
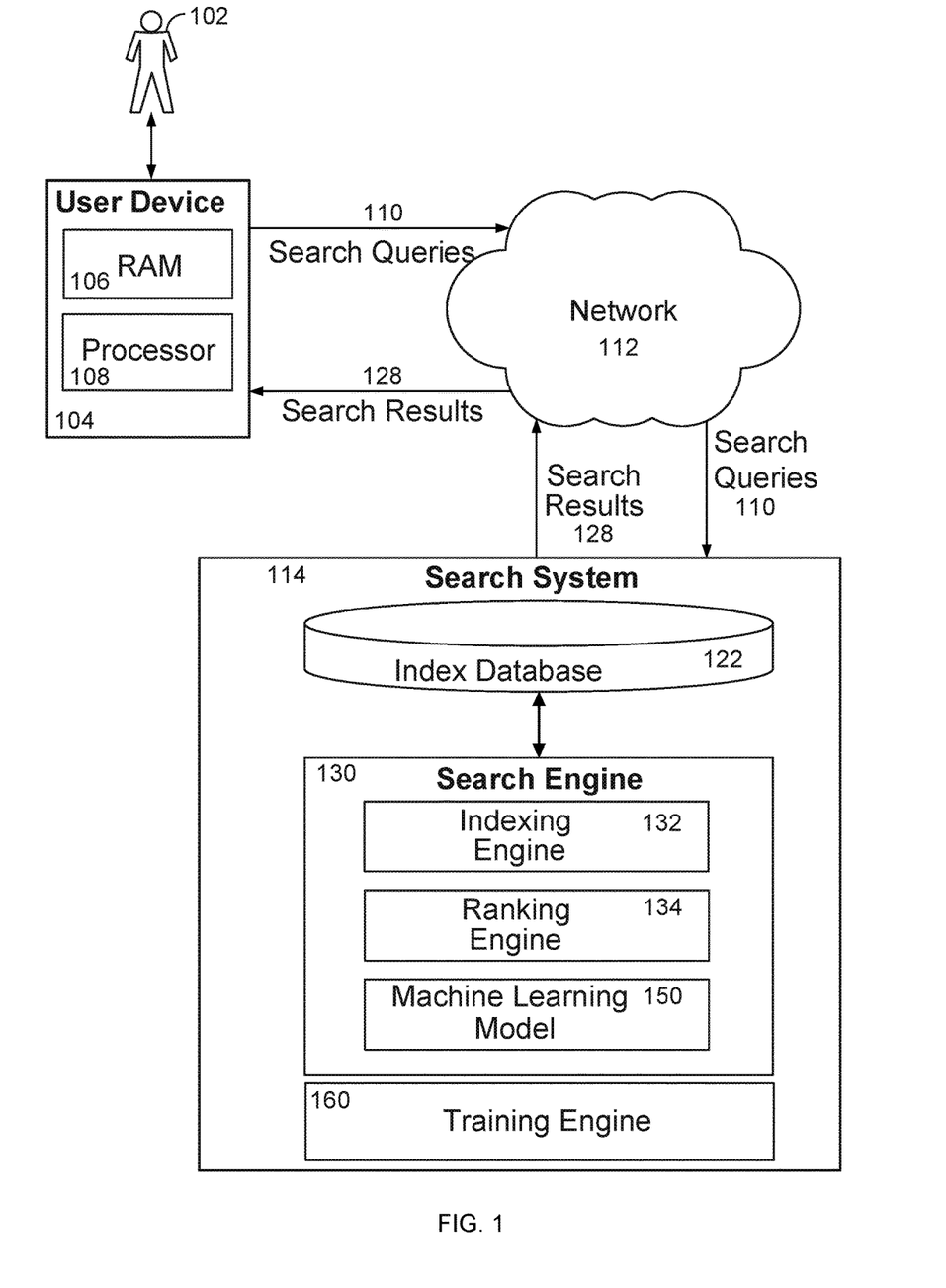
FIG. 1 is a block diagram of an example search system.

FIG. 1 shows an example search system 114. The search system 114 is an example of an information retrieval system in which the systems, components, and techniques described below can be implemented.

A user 102 can interact with the search system 114 through a user device 104. For example, the user device 104 can be a computer coupled to the search system 114 through a data communication network 112, e.g., local area network (LAN) or wide area network (WAN), e.g., the Internet, or a combination of networks. In some cases, the search system 114 can be implemented on the user device 104, for example, if a user installs an application that performs searches on the user device 104. The user device 104 will generally include a memory, e.g., a random access memory (RAM) 106, for storing instructions and data and a processor 108 for executing stored instructions. The memory can include both read only and writable memory.

The search system 114 is configured to search a collection of resources. Resources may include, for example, web pages, e-mails, text messages, files including text, image files, sound files, video files, a combination of files, one or more files with embedded links to other files, a news group posting, a blog, a business listing, an electronic version of printed text, a web advertisement, etc. In some implementations, the collection of resources is a user-specific collection of resources, e.g., e-mails in an e-mail account of a user, text messages associated with a user account of a user, files associated with the user in a file storage and/or synchronization service, and so on. In some other implementations, the collection can be resources available only over a private network, e.g., resources on an Intranet accessible only by users belonging to a particular organization.

The user 102 can submit search queries 110 to the search system 114 using the user device 104. When the user 102 submits a search query 110, the search query 110 is transmitted through the network 112 to the search system 114.

When the search query 110 is received by the search system 114, a search engine 130 within the search system 114 identifies resources in the collection of resources that satisfy the search query 110 and responds to the query 110 by generating search results 128 that each identifies a respective resource satisfying the search query 110. The search system 114 transmits the search results 128 through the network 112 to the user device 104 for presentation to the user 102, i.e., in a form that can be presented to the user 102.

The search engine 130 may include an indexing engine 132 and a ranking engine 134. The indexing engine 132 indexes resources in the collections of resources and adds the indexed resources to an index database 122.

The index database 122 associates the indexed resources in the collections of resources with values of search engine ranking signals for the indexed resources. Each search engine ranking signal is a different type of data characterizing a resource that is used by the ranking engine 134 in ranking the resource in response to a received search query. For example, the search engine ranking signal may include link information signals, user behavior signals, and so on. Link information signals are derived from links to the resource from other resources. For example, link information signals may include titles of resources linking to a given resource, anchor text of links to the given resource, i.e., text associated with the link to the given resource in the linking resource, and so on. User behavior signals are signals derived from the behavior of users of the search engine system 114, e.g., users who submit search queries to the search engine system 114. For example, the user behavior signals can include search queries that have been classified as frequently resulting in a selection of a search result identifying the resource by the user submitting the search query, i.e., a selection of the search result identifying the resource from a set of search results provided in response to the submission of the search query by the user.

The ranking engine 134 generates respective ranking scores for resources indexed in the index database 122 based on the values of search engine ranking signals for the resources and ranks the resources based on the respective ranking scores. The ranking score for a given resource reflects the relevance of the resources to the received search query 110, the quality of the given resource, or both.

In some cases, the index database 122 includes resources for which values of one or more search engine ranking signals are not available, e.g., because sufficient information characterizing to generate the value of the search engine ranking signal is not a given resource is not available to the search system 114

When a search engine ranking signal is not available for a resource, the indexing engine 132 can use a machine learning model 150 to improve the quality of the ranking score for the resource. In particular, the indexing engine 132 uses the machine learning model 150 to augment the index database 122 with a predicted value of the search engine ranking signal for the resource.

The machine learning model 150 is a machine learning model that is configured to receive the text of the resource for which a value of a search engine ranking signal is not available and to generate a predicted value of the search engine ranking signal for the resource. Once the machine learning model 150 generates the predicted value of the search engine ranking signal for the resource, the index database 122 is updated by associating the predicted value of the search engine ranking signal generated by the machine learning model 150 with the resource. The ranking engine 134 can then use the predicted value to generate ranking scores for the resource in response to received search queries. In some implementations, the machine learning model 150 is configured to receive, in addition to or instead of the text of the resource, other data, e.g., an image, sound, or a video, of the resource for which the value of the search engine ranking signal is not available and to generate a predicted value of the search engine ranking signal for the resource.

In some implementations, the index database 122 includes a resource for which a value of first search engine ranking signal is available, but a value of a second search engine ranking signal is not available. In these cases, the machine learning model 150 can be configured to receive (i) the text of the resource, other data of the resource, or both and (ii) the value of the first search engine ranking signal for the resource and to generate a predicted value of the second search engine ranking signal for the resource. The ranking engine 134 can use both the value of the first search engine ranking signal and the updated value of the second search engine ranking signal to generate ranking scores for the resource in response to received search queries.

The machine learning model 150 can be any of a variety of machine learning models. For example, the machine learning model 150 can be a deep machine learning model, e.g., a neural network, that includes multiple layers of non-linear operations.

In some implementations, the machine learning model 150 includes an encoder neural network and a decoder neural network. The encoder neural network processes text in a resource to generate an encoded representation of the resource. The decoder neural network generates a predicted value of the search engine ranking signal using the encoded representation of the resource.

In some implementations, the machine learning model 150 can include an encoder neural network and multiple decoder neural networks. For example, the machine learning model 150 can include a first decoder neural network and a second decoder neural network. The encoder neural network processes text in a resource to generate an encoded representation of the resource. The first decoder neural network generates a predicted value of a first search engine ranking signal using the encoded representation of the resource and the second decoder neural network generates a predicted value of a second search engine ranking signal using the encoded representation of the resource. As another example, the machine learning model 150 can be a shallow machine learning model, e.g., a generalized linear model. An example architecture of a neural network that includes an encoder neural network and a decoder neural network and that can be trained to predict values of search engine ranking signals is described in Sutskever, Ilya, Oriol Vinyals, and Quoc V. Le. "Sequence to sequence learning with neural networks." *Advances in neural information processing systems.* 2014. Another example neural network architecture is described in Wu, Yongui, et al. "Google's Neural Machine Translation System: Bridging the Gap between Human and Machine Translation." *ArXiv preprint arXiv:*1609.08144 (2016). An example architecture of a neural network that includes an encoder that can encode other data (in this example, images) and that can be trained to predict values of search engine ranking signals is described in Vinyals, Oriol, et al. "Show and tell: A neural image caption generator." *Proceedings of the IEEE Conference on Computer Vision and Pattern Recognition.* 2015.

To train the machine learning model 150 so that the machine learning model 150 can be used to generate values of search engine ranking signals for resources in the index database 122, the search system includes a training engine 160. The training engine 160 trains the ranking machine learning model 150 on training data generated using resources that are already associated with values of the search engine ranking signals. In some implementations, the training data can be generated using resources from a different collection of resources than the collection that the search system 114 is configured to search. For example, the different collection may be a collection of Internet resources, e.g., web pages that are publicly accessible on the Internet. Training the machine learning model will be described in greater detail below with reference to FIG. 3.

Figure 2:
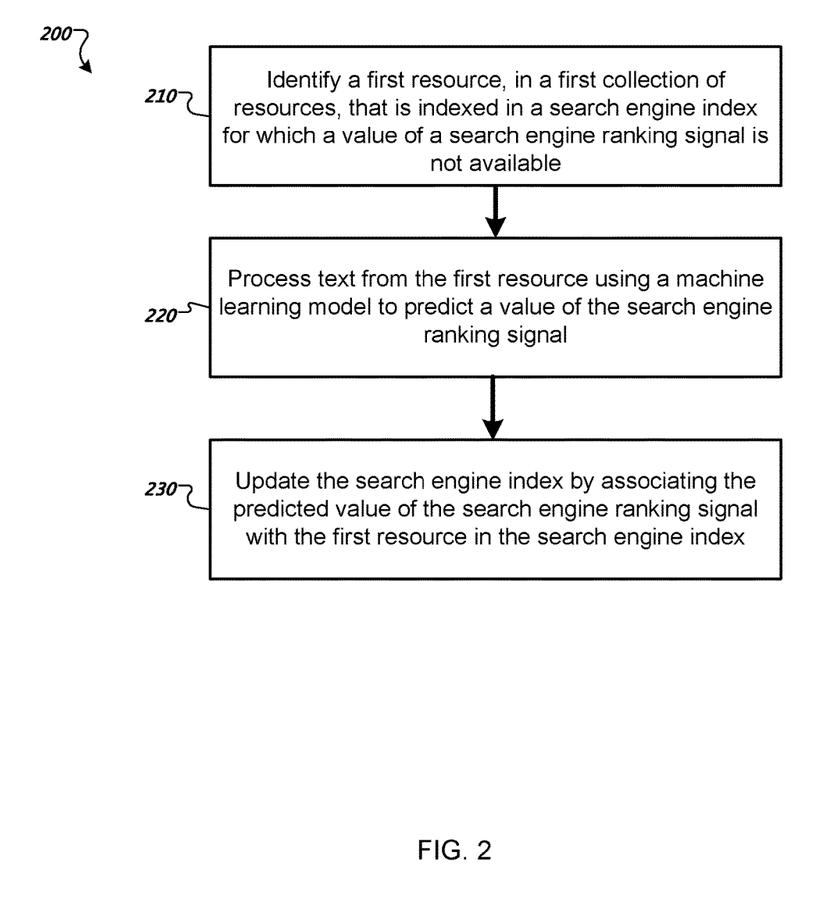
FIG. 2 is a flowchart of an example process for predicting values of search engine ranking signals for resources.

FIG. 2 is a flowchart of an example process 200 for predicting values of search engine ranking signals for resources for which values of search engine ranking signals are not available. For convenience, the process 200 will be described as being performed by a system of one or more computers located in one or more locations. For example, a search system, e.g., the search system 114 of FIG. 1, appropriately programmed in accordance with this specification, can perform the process 200.

The system identifies 210 a first resource in a first collection of resources that is indexed in a search engine index. The first resource is a resource for which a value of a search engine ranking signal is not available, i.e., the first resource does not have a value of the signal associated with it in the search engine index or is associated with a placeholder value or other data in the index that indicates that the value is unavailable. The search engine ranking signal is a signal that is used by a search engine to generate ranking scores for resources in response to received search queries. For example, the search engine ranking signal may be search queries that have been classified as frequently resulting in a selection of a search result identifying the resource by the user submitting the search query, i.e., a selection of the search result identifying the resource from a set of search results provided in response to the submission of the search query by the user. As another example, the search engine ranking signal may be anchor text for the resource, i.e., text associated with links to the resource in other resources. As another example, the search engine ranking signal may be titles of resources that link to the resource.

The system processes 220 text from the first resource using a machine learning model. In particular, the machine learning model is configured to process the text to predict a value of the search engine ranking signal for the first resource. The machine learning model has been trained to receive text of a resource for which a value of a search engine ranking signal is not available and to generate the predicted value of the search engine ranking signal for the resource. For example, when the search engine ranking signal is search queries that has been classified as frequently resulting in a selection of a search result identifying the resource by the user submitting the search query, i.e., a selection of the search result identifying the resource from a set of search results provided in response to the submission of the search query by the user, the predicted value of the search engine ranking signal is text of one or more search queries that the machine learning model predicts would be classified as frequently resulting in selections of search results identifying the resource. As another example, when the search engine ranking signal is anchor text of links to a given resource, i.e., text associated with the link to the given resource in the linking resource, the predicted value of the search engine ranking signal is text that the machine learning model predicts would be anchor text of links to the resource. As another example, when the search engine ranking signals are titles of resources linking to a given resource, the predicted value of the search engine ranking signal is text that the machine learning model predicts would be titles of resources linking to the resource. Training the machine learning model is described in more detail below with reference to FIG. 3.

In some implementations, the machine learning model is configured to process data, e.g., an image, sound, or a video, of the first resource to predict a value of the search engine ranking signal for the first resource.

The system updates 230 the search engine index by associating the predicted value of the search engine ranking signal with the first resource in the search engine index. The predicted value of the search engine ranking signal can be used by the search engine to generate a ranking score for the resource, i.e., in place of an actual value of the search engine ranking signal.

Figure 3:
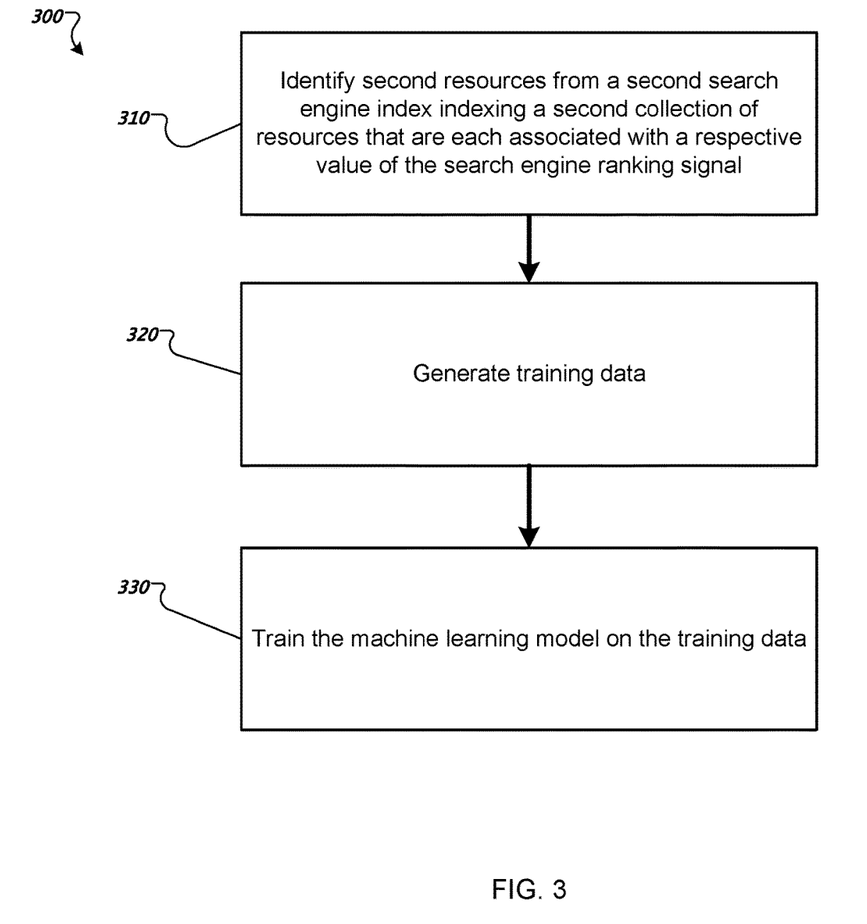
FIG. 3 is a flowchart of an example process for training a machine learning model.

FIG. 3 is a flowchart of an example process 300 for training a machine learning model. For convenience, the process 300 will be described as being performed by a system of one or more computers located in one or more locations. For example, a search system, e.g., the search system 114 of FIG. 1, appropriately programmed in accordance with this specification, can perform the process 300.

The system identifies 310 second resources from a second search engine index that indexes a second collection of resources. The second collection of resources are resources that are each associated with a respective value of the search engine ranking signal. For example, the second collection of resources can be Internet resources, e.g., web pages and other resources that are publically available on the Internet. In some implementations, the second collection of resources is different from the first collection of resources described above with reference to FIG. 2. For example, the first collection of resources can be a user-specific collection of resources, e.g., e-mails in an e-mail account of a user, text messages associated with a user account of a user, files associated with the user in a file storage and/or synchronization service, and so on. As another example, the first collection can be resources available only over a private network, e.g., resources on an Intranet accessible only by users belonging to a particular organization.

The system generates 320 training data. The training data includes, for each of the second resources, (i) text of the second resource and (ii) the respective value of the search engine ranking signal for the second resource.

The system trains 330 the machine learning model on the training data. In particular, the system trains the machine learning model to predict accurate search engine values for the second resources by optimizing an objective function using a conventional machine learning training technique, e.g., stochastic gradient descent with backpropagation or, if the machine learning model is recurrent, stochastic gradient descent with backpropagation through time.

The above description has described implementations where the machine learning model is used to predict a search engine ranking signal value that is not available for a given resource. In some cases, however, even though certain resources in a search engine index are associated with one or more search queries that have been classified as frequently resulting in a selection of a search result identifying the first resource by a user submitting the search query, adding additional search queries to the search engine index would result in the ranking engine being able to generate more accurate ranking scores for the resources. In some implementations, a machine learning model that predicts additional search queries based on existing search queries can be used to augment the search engine index and to improve the operation of the ranking engine.

Figure 4:
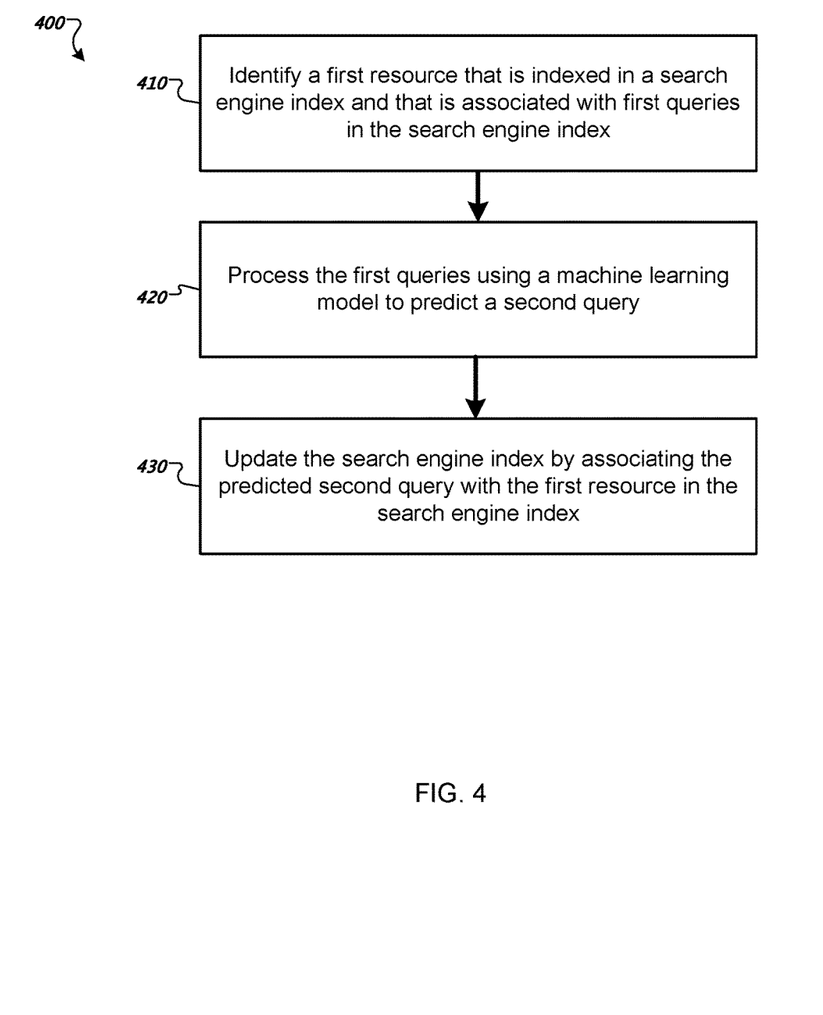
FIG. 4 is a flowchart of an example process for predicting a query.

FIG. 4 is a flowchart of an example process 400 for predicting a query. For convenience, the process 400 will be described as being performed by a system of one or more computers located in one or more locations. For example, a search system, e.g., the search system 114 of FIG. 1, appropriately programmed in accordance with this specification, can perform the process 400.

The system identifies 410 a first resource that is indexed in a search engine index and that is associated with one or more first queries in the search engine index. The first queries may be search queries that have been classified as frequently resulting in a selection of a search result identifying the first resource by a user submitting the search query, i.e., a selection of the search result identifying the first resource from a set of search results provided in response to the submission of the search query by the user.

The system processes 420 the first queries using a machine learning model to predict a second query. In particular, the machine learning model is configured to process text of the first queries to predict a second query that is another query that would be classified as frequently resulting in a selection of a search result identifying the first resource by a user submitting the search query. In some implementations, the machine learning model is configured to process only the text of the one or more first queries that are already associated with the resource to generate the predicted second query. In some other implementations, the machine learning model is configured to process the text of the resource and the text of the one or more first queries that are already associated with the resource to generate the predicted second query. Training the machine learning model to predict second queries is described in more detail below with reference to FIG. 5.

The system updates 430 the search engine index by associating the predicted second query with the first resource in the search engine index. The predicted second query can be used along with the one or more first queries by the search engine in generating a ranking score for the resource in response to received search queries.

Figure 5:
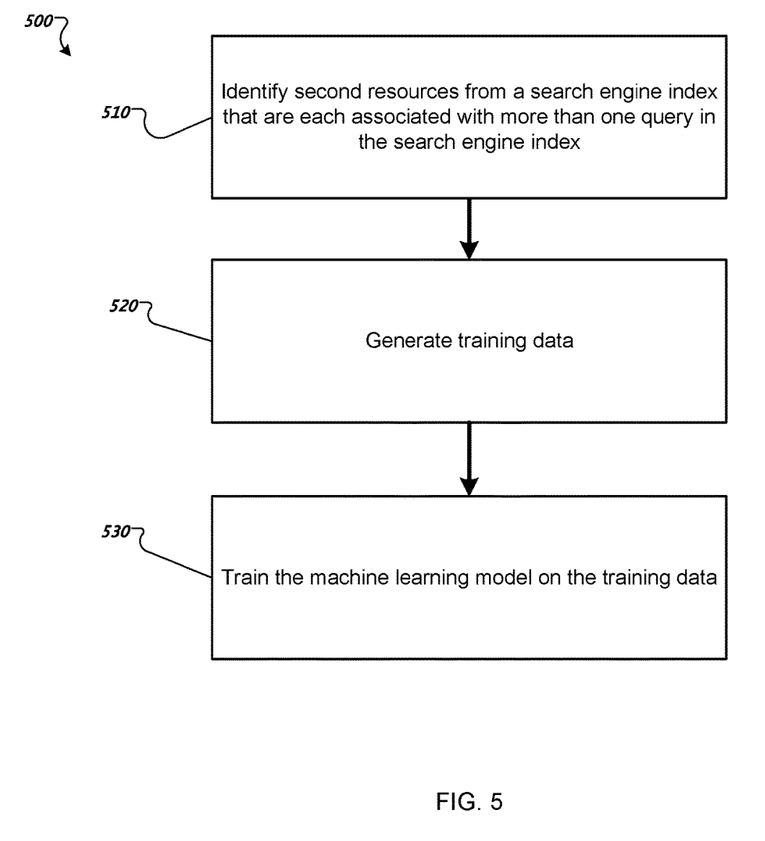
FIG. 5 is a flowchart of an example process for training a machine learning model.

FIG. 5 is a flowchart of an example process 500 for training a machine learning model. For convenience, the process 500 will be described as being performed by a system of one or more computers located in one or more locations. For example, a search system, e.g., the search system 114 of FIG. 1, appropriately programmed in accordance with this specification, can perform the process 500.

The system identifies 510 second resources indexed in a search engine index, e.g., the same search engine index or a different search engine index, that are each associated with more than one query in the search engine index.

The system generates 520 training data. The training data includes, for each of the second resources, (i) an input query that is associated with the second resource and (ii) one or more output queries that are also associated with the second resource. In implementations where the machine learning model is configured to also process the text of a resource, the training data also includes, for each of the second resources, the text of the resource.

The system trains 530 the machine learning model on the training data. In particular, the system trains the machine learning model to accurately predict additional search queries by optimizing an objective function using a conventional machine learning training technique, e.g., stochastic gradient descent with backpropagation or, if the machine learning model is recurrent, stochastic gradient descent with backpropagation through time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language resource, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification, the term "database" will be used broadly to refer to any collection of data: the data does not need to be structured in any particular way, or structured at all, and it can be stored on storage devices in one or more locations. Thus, for example, an index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of augmenting a first search engine index that indexes resources from a first collection of resources, the method comprising:
    maintaining, by one or more computers, a first search engine index that indexes resources from a first collection of resources and associates each of a plurality of resources from the first collection of resources with a respective value of a search engine ranking signal for the resource, wherein the respective value of the search engine ranking signal is text of a particular type corresponding to the search engine ranking signal that characterizes the resource;
    identifying, by the one or more computers, a first resource, in the first collection of resources, that is (i) indexed in the first search engine index and (ii) for which an actual value of the search engine ranking signal is not available in the first search engine index;
    processing, by the one or more computers, text from the first resource using a machine learning model, the machine learning model being configured to:
        process the text to generate text of the particular type that is predicted to characterize the resource;
    updating, by the one or more computers, the first search engine index by associating the text generated by the machine learning model with the first resource as a predicted value of the search engine ranking signal in the first search engine index; and
    providing the predicted value for the search engine ranking signal in place of the actual value for the search engine ranking signal to a search engine for use in generating a ranking score for the first resource in response to a received search query.

2. The method of claim 1, further comprising:
    identifying a plurality of second resources from a second search engine index that indexes a second collection of resources, each of the second resources being associated in the second search engine index with a respective value of the search engine ranking signal for the second resource;

generating training data that includes, for each of the plurality of second resources:
  text of the second resource, and
  the respective value of the search engine ranking signal for the second resource; and
training the machine learning model on the training data.

3. The method of claim 2, wherein the second collection of resources is a collection of Internet resources.

4. The method of claim 3, wherein the first collection of resources is different from the second collection of resources.

5. The method of claim 4, wherein the first collection of resources is a collection of entity-specific resources.

6. The method of claim 1, wherein the text generated by the machine learning model includes one or more search queries that users would submit to the search engine to search for the first resource.

7. The method of claim 1, wherein the machine learning model comprises:
  an encoder neural network configured to process the text of the first resource to generate an encoded representation of the first resource; and
  a first decoder neural network configured to generate the text of the particular type that is predicted to characterize the resource using the encoded representation of the first resource.

8. The method of claim 7, wherein a value of a second search engine ranking signal also used by the search engine in ranking resources in response to received search queries is also not available for the first resource in the first search engine index, and wherein the method further comprises:
  processing the encoded representation of the first resource using a second decoder neural network configured to generate a predicted value of the second search engine ranking signal using the encoded representation of the first resource.

9. A method comprising:
  identifying, by one or more computers, a plurality of first resources from a first search engine index that indexes a first collection of resources, each of the first resources being associated in the first search engine index with a respective value of a search engine ranking signal for the first resource, wherein the respective values of the search engine ranking signal are used by a search engine to generate ranking scores for the resources in response to received search queries, wherein each respective value of the search engine ranking signal is text of a particular type corresponding to the search engine ranking signal that characterizes the corresponding resource;
  generating, by the one or more computers, training data that includes, for each of the plurality of first resources:
    text of the first resource, and
    the respective value of the search engine ranking signal for the first resource;
  training, by the one or more computers, a machine learning model on the training data, wherein the machine learning model is configured to:
    receive text of a resource, and
    process the text to generate text of the particular type that is predicted to characterize the resource.

10. The method of claim 9, further comprising:
  identifying a second resource, in a second collection of resources, that is indexed in a second search engine index for which a value of a search engine ranking signal is not available, wherein a search engine uses values of the search engine ranking signal in ranking resources in response to received search queries;
  processing text from the second resource using the trained machine learning model, the trained machine learning model being configured to:
    process the text to generate second text of the particular type that is predicted to characterize the second resource; and
  updating, by the one or more computers, the first search engine index by associating the second text generated by the machine learning model with the second resource as a predicted value of the search engine ranking signal in the first search engine index; and
  providing the predicted value for the search engine ranking signal in place of the actual value for the search engine ranking signal to a search engine for use in generating a ranking score for the second resource in response to a received search query.

11. The method of claim 10, wherein the first collection of resources is a collection of Internet resources.

12. The method of claim 11, wherein the second collection of resources is different from the first collection of resources.

13. The method of claim 12, wherein the second collection of resources is a collection of entity-specific resources.

14. The method of claim 10, wherein the predicted value of the search engine ranking signal for the second resource includes one or more search queries that users would submit to the search engine to search for the second resource.

15. The method of claim 10, wherein the machine learning model comprises:
  an encoder neural network configured to process the text of the second resource to generate an encoded representation of the second resource; and
  a second decoder neural network configured to generate the predicted value of the search engine ranking signal using the encoded representation of the second resource.

16. The method of claim 15, wherein a value of a first search engine ranking signal also used by the search engine in ranking resources in response to received search queries is also not available for the second resource, and wherein the method further comprises:
  processing the encoded representation of the second resource using a first decoder neural network configured to generate a predicted value of the first search engine ranking signal using the encoded representation of the second resource.

17. A system comprising one or more computers and one or more storage devices storing instructions that when executed by the one or more computers cause the one or more computers to perform operations comprising:
  maintaining a first search engine index that indexes resources from a first collection of resources and associates resources from the first collection of resources with a corresponding value of a search engine ranking signal for the resource, wherein the corresponding value of the search engine ranking signal is text of a particular type corresponding to the search engine ranking signal that characterizes the resource;
  identifying a first resource, in the first collection of resources, that is (i) indexed in the first search engine index and (ii) for which an actual value of the search engine ranking signal is not available is not available in the first search engine index;

processing text from the first resource using a machine learning model, the machine learning model being configured to:

process the text to generate text of the particular type that is predicted to characterize the resource;

updating the first search engine index by associating the text generated by the machine learning model with the first resource as a predicted value of the search engine ranking signal in the first search engine index; and providing the predicted value for the search engine ranking signal in place of the actual value for the search engine ranking signal to a search engine for use in generating a ranking score for the first resource in response to a received search query.

18. The system of claim 17, the operations further comprising:

identifying a plurality of second resources from a second search engine index that indexes a second collection of resources, each of the second resources being associated in the second search engine index with a respective value of the search engine ranking signal for the second resource;

generating training data that includes, for each of the plurality of second resources:

text of the second resource, and the respective value of the search engine ranking signal for the second resource; and training the machine learning model on the training data.

19. The system of claim 17, wherein the text generated by the machine learning model includes one or more search queries that users would submit to the search engine to search for the first resource.

20. The system of claim 17, wherein the machine learning model comprises:

an encoder neural network configured to process the text of the first resource to generate an encoded representation of the first resource; and a first decoder neural network configured to generate the text of the particular type that is predicted to characterize the resource using the encoded representation of the first resource.

* * * * *